(12) United States Patent
Ito

(10) Patent No.: US 7,333,403 B2
(45) Date of Patent: Feb. 19, 2008

(54) CAROUSEL CHANGER INCLUDING A TURNTABLE HAVING A PLURALITY OF TRAYS

(75) Inventor: Kazunari Ito, Neyagawa (JP)

(73) Assignee: Onkyo Corporation, Osaka (JP)

(*) Notice: Subject to any disclaimer, the term of this patent is extended or adjusted under 35 U.S.C. 154(b) by 763 days.

(21) Appl. No.: 10/799,133

(22) Filed: Mar. 12, 2004

(65) Prior Publication Data

US 2004/0223419 A1    Nov. 11, 2004

(30) Foreign Application Priority Data

May 9, 2003    (JP) ............................ 2003-131097

(51) Int. Cl.
  *G11B 7/085* (2006.01)
(52) U.S. Cl. .................................. 369/30.86
(58) Field of Classification Search ............. 369/30.27, 369/30.36, 30.86, 30.91; 720/606
See application file for complete search history.

(56) References Cited

U.S. PATENT DOCUMENTS

| | | | |
|---|---|---|---|
| 5,197,056 A * | 3/1993 | Van Heusden et al. | 369/30.86 |
| 5,293,362 A * | 3/1994 | Sakurai et al. | 369/30.8 |
| 5,422,869 A * | 6/1995 | Versleegers | 369/30.97 |
| 5,742,571 A * | 4/1998 | Hoshino et al. | 369/30.98 |
| 5,771,213 A * | 6/1998 | Koshino et al. | 369/30.91 |
| 5,802,021 A * | 9/1998 | Mukaida | 369/30.32 |
| 5,848,033 A * | 12/1998 | Park | 369/30.29 |
| 5,862,107 A * | 1/1999 | Goto | 386/126 |
| 6,618,332 B2 * | 9/2003 | Ochi | 369/30.79 |
| 2002/0075767 A1* | 6/2002 | Seo | 369/30.91 |
| 2003/0193848 A1* | 10/2003 | Lee | 369/30.33 |

FOREIGN PATENT DOCUMENTS

| | | |
|---|---|---|
| JP | 05-041025 | 2/1993 |
| JP | 5-128693 | 5/1993 |
| JP | 07-153167 | 6/1995 |
| JP | 2002-184080 | 6/2002 |
| JP | 2002-269889 | 9/2002 |

* cited by examiner

*Primary Examiner*—Hoa T. Nguyen
*Assistant Examiner*—Henok Heyi
(74) *Attorney, Agent, or Firm*—Renner, Otto, Boiselle & Sklar, LLP

(57) ABSTRACT

A turntable provided in the carousel changer has a plurality of trays provided around its rotating shaft. The turntable is provided with an annular rib including a plurality of recessed portions and a plurality of raised portions. A sensor is provided to have the rib passed therethrough and detects recessed portions and raised portions in the rib as the turntable is driven by a motor to rotate. The controller receives a detection result by the sensor and controls the motor based on the ratio of the widths of a raised portion and a recessed portion adjacent to each other in the rib. Therefore, this carousel changer can accurately stop a tray carrying an optical disk desired to be reproduced in a prescribed position.

6 Claims, 9 Drawing Sheets

CAROUSEL CHANGER INCLUDING A TURNTABLE HAVING A PLURALITY OF TRAYS

BACKGROUND OF THE INVENTION

1. Field of the Invention

The present invention relates to carousel changers, and more specifically, to a carousel changer including a turntable having a plurality of trays to carry a plurality of disks thereon.

2. Description of the Related Art

A carousel changer is provided in a CD player, a DVD player or the like that serves as an optical disk changer. As shown in FIG. 5, a carousel changer 30 includes a turntable 20. The turntable 20 has a plurality of trays 1 around its rotating shaft 11. The trays each carry an optical disk such as a CD and a DVD thereon. The turntable 20 rotates counter-clockwise in FIG. 5 and transports a tray having an optical disk desired to be reproduced onto a reproducing device 13. An annular rack rail 8 is provided under the turntable 20. The rack rail 8 is engaged with a pinion gear 7 attached to a motor 12, and the turntable 20 is driven by the motor 12 to rotate. The carousel changer 30 further includes an annular rib R10 and a sensor 9 provided under the turntable 20. The rib R10 and the sensor 9 are used to place the center of a tray 1 carrying thereon an optical disk (that the user desires to reproduce) in the center of a support unit 14 in the reproducing device 13.

FIG. 6 is a sectional view taken along line VI-VI in FIG. 5. The rib R10 includes a plurality of recessed portions A1 and a plurality of raised portions B1. The recessed portions A1 and the raised portions B1 are used to identify the tray numbers of the trays 1, and place the center of a tray 1 in the center of the support unit 14. The sensor 9 has the rib R10 passed therethrough (though not in contact), detects recessed portions A1 and raised portions B1 of the rib R10 and outputs the result of detection to a controller 40. The controller 40 determines the tray number and stopping position of each of the trays 1 based on the detection result output from the sensor 9 and controls the motor 12 accordingly.

FIG. 7 is a partly developed view of the annular rib R10 shown in FIG. 6. The rib R10 has a stop area SA for stopping each tray 1 so that the center of the tray 1 is placed in the center of the support unit 14 and a count area CA for specifying the tray number of each tray 1. The turntable 20 in FIG. 5 includes six trays 1, and therefore the rib R10 includes six stop areas SA and six count areas CA. The stop area SA is made of a recessed portion $A_{SA}$ indicating a stopping position and two raised areas $B_{SA}$ having the recessed portion $A_{SA}$ therebetween. When the recessed portion $A_{SA}$ is subjected to the sensor 9, the center of a tray 1 is placed in the center of the support unit 14. The count area CA is made of a plurality of recessed portions $A_{CA}$ and a plurality of raised portions $B_{CA}$. In FIG. 7, the plurality of raised portions $B_{CA}$ represent a tray number. When for example there are four such raised portions $B_{CA}$, the count area CA indicates tray number "4."

Referring to FIG. 8, it will be described how the carousel changer 30 operates to exchange an optical disk on a tray of number 3 (hereinafter as "tray No. 3") with an optical disk on a tray of number 4 (hereinafter as "tray No. 4").

When there is an optical disk on the tray with tray No. 3 on the support unit 14, the sensor 9 detects the recessed portion $A_{SA3}$ in the stop area SA3 in the rib R10. Herein, the stop area SA3 refers to a stop area for the tray No. 3. The turntable 20 is stopped as the sensor 9 is subjected to (detects) the recessed portion $A_{SA3}$ in the stop area SA3, the center of the disk on the tray No. 3 is positioned on the support unit 14. At time t1, a command to reproduce the disk on the tray No. 4 is externally given. At the time, the controller 40 supplies positive voltage V1 to the motor 12. In response to the applied positive voltage V1, the motor 12 drives the turntable 20 to start to rotate counter-clockwise. Immediately after time t1, the sensor 9 detects the raised portion $B_{SA3}$ in the stop area SA3. At time t2, the sensor 9 detects the recessed portion $A_{CA4}$ in the count area CA4 for the tray No. 4. At the time, the controller 40 determines that the raised portion $B_{SA3}$ has passed the sensor 9 and the sensor 9 has started detecting the count area CA4. The controller 40 counts up the tray numbers by one each at time t3, t4, t5, and t6 when the sensor 9 detects a raised portion $B_{CA4}$. In the count area CA4, the sensor 9 repeatedly detects the raised portion $B_{CA4}$ and the recessed portion $B_{CA4}$. If the sensor 9 cannot detect a raised portion $B_{CA4}$ after starting detecting the recessed portion $A_{CA4}$ for a prescribed period $\Delta t$, the controller 40 ends counting up of the tray numbers, and identifies the tray number. In FIG. 8, at time t8 the prescribed period $\Delta t$ after time t7, the controller 40 specifies the tray number as "4."

At time t9, the sensor 9 detects a raised portion $B_{SA4}$ in the stop area SA4. The stop area SA4 is a stop area for the tray No. 4, and therefore the controller 40 determines that the stop area for the tray No. 4 has been entered. At the time, the controller 40 lowers the voltage supplied to the motor 12 from the voltage V1 to V2 and lowers the rotating speed of the turntable 20 accordingly. At time t10 when the sensor 9 detects the recessed portion $A_{SA4}$ in the stop area SA4, the controller 40 temporarily supplies negative voltage V3 to the motor 12 to apply the "brake" and then stops supplying voltage. This stops the turntable 20.

The conventional carousel changer 30 determines the count end time for the tray number whether the prescribed period $\Delta t$ elapses after the sensor 9 starts detecting a recessed portion $A_{CA}$ in the count area CA. Therefore, when the rotating speed of the turntable 20 changes by friction or the like caused by the pinion gear 7 or the rack rail 8, the count end time could be mistakenly determined. Since the width of the recessed portion $A_{CA}$ must be secured for the prescribed period $\Delta t$, the width of the raised portions $B_{CA}$ used for counting the tray numbers cannot be increased. When the tray number is "6," at least six raised portions $B_{CA}$ must be provided in the count area CA, and the recessed portion $A_{CA}$ having the width corresponding to the prescribed time $\Delta t$ must be provided in the count area CA. As a result, the width of the raised portion $B_{CA}$ is limited. It is difficult to form a raised portion $B_{CA}$ having a small width, and the portion with the small width is not strong enough.

In order to secure a strong rib, a rib R1 having a stop area SA and a rib R2 having a count area CA as shown in FIG. 9 may be used to control the rotation of the turntable 20. In this case, the tray number is determined by counting the recessed portions $A_{CA}$ in the rib R2, so that the width of raised portions $B_{CA}$ does not have to be small. However, the use of the two ribs necessitates the use of two sensors, which pushes up the manufacturing cost.

SUMMARY OF THE INVENTION

It is an object of the invention to provide a carousel changer that can accurately stop a tray having an optical disk desired to be reproduced in a prescribed position.

A carousel changer according to the invention includes a turntable, a motor, a rib, a sensor, and a controller. The turntable is provided with a plurality of trays each carrying a disk around its rotating shaft. The motor rotates the turntable. The rib is formed annularly at the turntable and includes a plurality of recessed portions and a plurality of raised portions for indicating the position of the plurality of trays at the turntable. The sensor detects the recessed portions and the raised portions when the turntable rotates. The controller controls the motor based on the ratio of the width of the recessed portion and the width of the raised portion obtained as a detection result by the sensor.

The carousel changer according to the invention detects the widths of the recessed portion and the raised portion formed at the turntable while the turntable rotates, and the position of the plurality of trays at the turntable can be identified based on comparison between the widths of the recessed portion and the raised portion. Therefore, the carousel changer can determine the position of the trays more accurately than the conventional carousel changer.

The controller preferably controls the motor based on the ratio of the widths of the recessed portion and the raised portion adjacent to each other.

In this case, the carousel changer according to the invention can accurately determine the position of the trays based on the ratio of the widths of the recessed portion and the raised portion adjacent to each other. Therefore, the carousel changer according to the invention can determine the position of the trays more readily and accurately.

The controller preferably includes a timer. The timer counts time for which the sensor detects the recessed portion or the raised portion to obtain the width of said recessed portion or the raised portion.

In this way, the widths of the recessed portion and the raised portion are determined based on the count value of the timer during detection. Therefore, the widths of the recessed portion and the raised portion can be obtained more easily.

The rib preferably includes a plurality of count areas and a plurality of stop areas. The plurality of count areas are each for identifying one of the trays. The plurality of stop areas are for stopping the rotation of the turntable when the plurality of trays come to a prescribed position. The stop areas are alternated with said count areas. The controller determines that the sensor ends detection of the count area and starts to detect the stop area when the width of the raised portion is at most the width of the adjacent recessed portion upon detecting in the count area, and the controller determines that the sensor ends detection of the stop area and starts to detect the count area when the width of the raised portion is at most the width of the adjacent recessed portion upon detecting in the stop area.

In this way, the carousel changer can identify each of the plurality of trays by the count area and can see each of the trays in a prescribed position by the stop area. In the rib, the count areas and the stop areas are alternately arranged. Therefore, when a tray identified by the count area is a tray with a disk the user desires to reproduce thereon, the carousel changer can stop the tray in a prescribed position by the stop area adjacent to the count area.

The controller preferably identifies each of the plurality of trays based on the number of recessed portions or raised portions detected by the sensor while the sensor detects in the count area.

In this way, the plurality of trays can be identified based on the number of the recessed portions or raised portions in the count area. For example, when there are four recessed portions in a count area, the tray has "4" as the tray number. In this way, the tray can be identified easily and accurately.

The number of recessed portions or raised portions in the count area is different from the number of recessed portions or raised portions in the stop area.

In this way, the controller does not mistake the count areas with the stop areas. Therefore, it can be prevented that the controller will mistakenly identify the tray based on the number of the recessed portions or raised portions in the stop area.

These and other objects and advantages of the present invention will become clear from the following description with reference to the accompanying drawings.

DETAILED DESCRIPTION OF THE PREFERRED EMBODIMENTS

Figure 1:
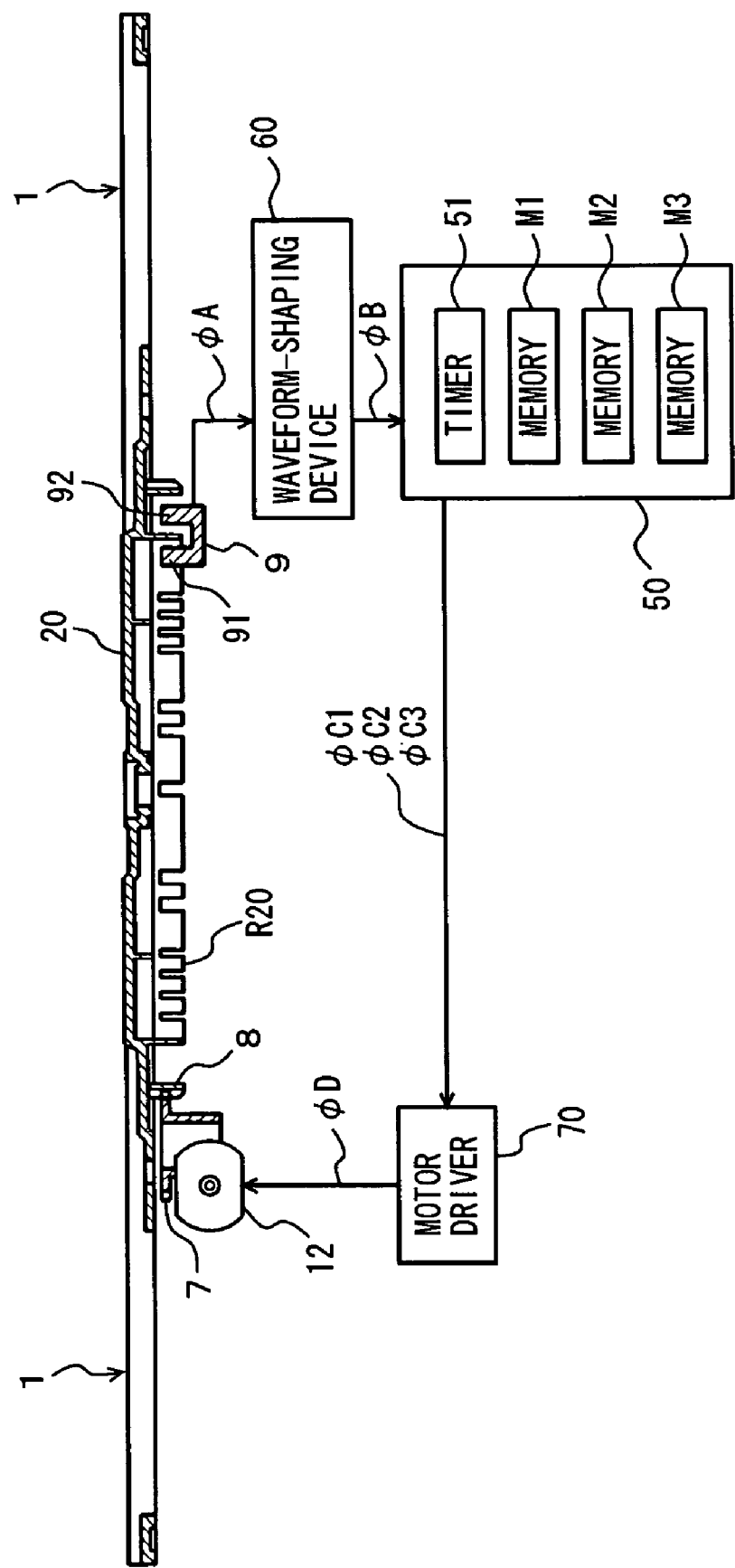
FIG. 1 is a sectional view of a carousel changer according to an embodiment of the invention.

Now, an embodiment of the invention will be described in conjunction with the accompanying drawings in which the same or corresponding portions are denoted by the same reference characters and their descriptions apply likewise.

Referring to FIG. 1, a carousel changer 80 according to the embodiment of the invention includes a turntable 20, a motor 12 that rotates the turntable 20, a pinion gear 7 provided to the motor 12, a rack rail 8 engaged with the pinion gear 7, a rib R20, a sensor 9, a waveform-shaping device 60, a controller 50, and a motor driver 70.

Figure 5:
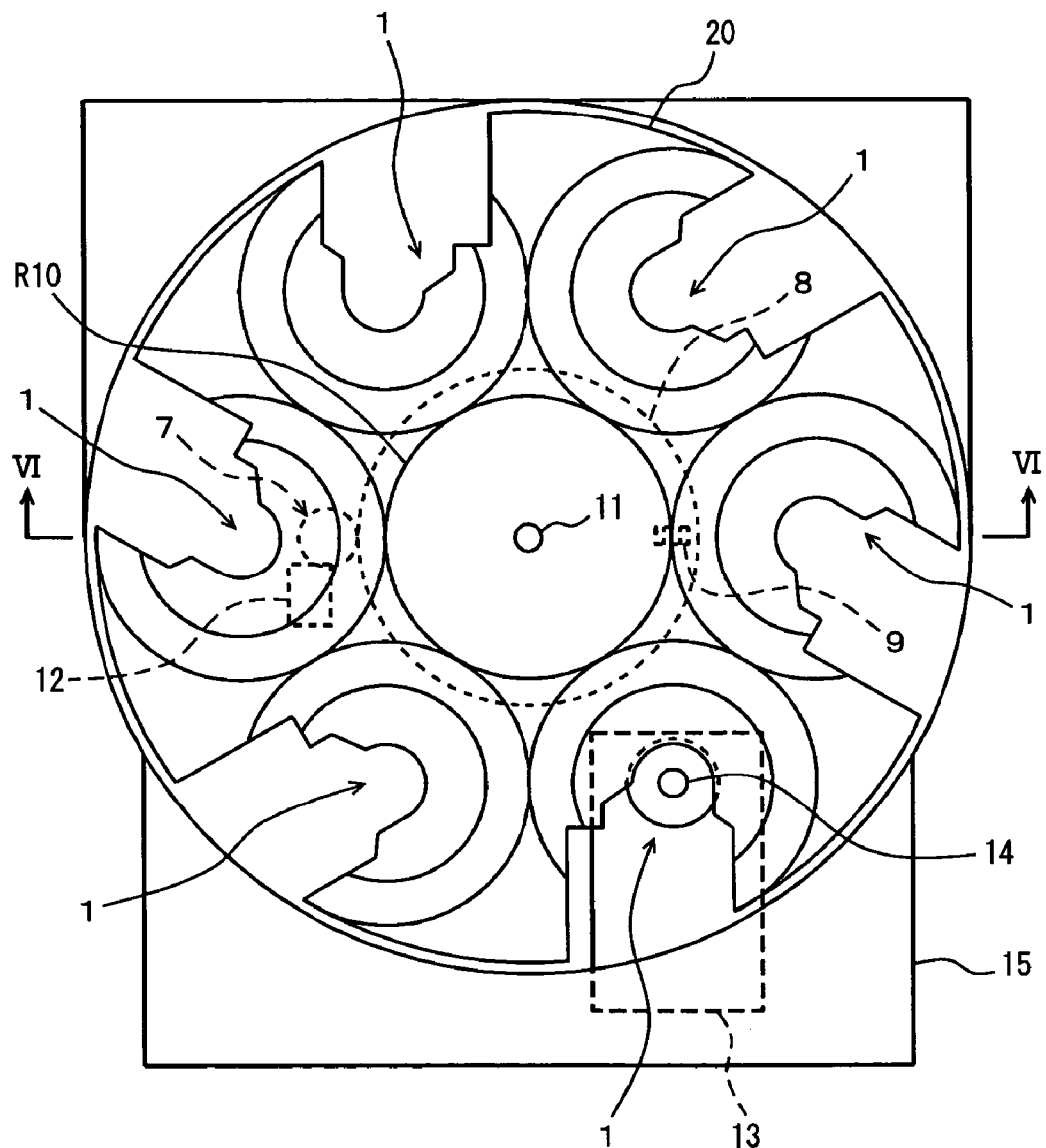
FIG. 5 is a top view of a conventional carousel changer.
Figure 6:
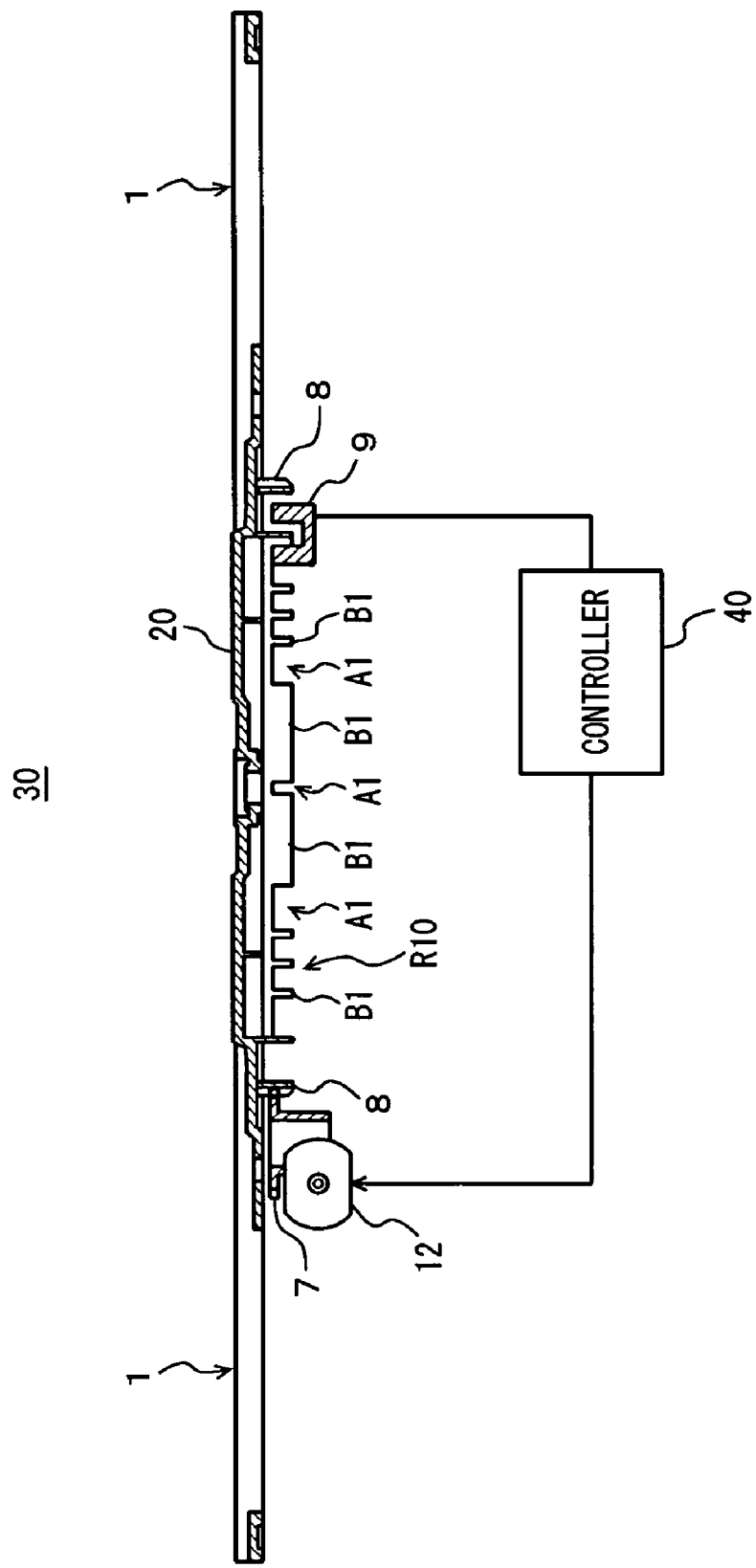
FIG. 6 is a sectional view taken along line VI-VI in FIG. 5.
Figure 7:
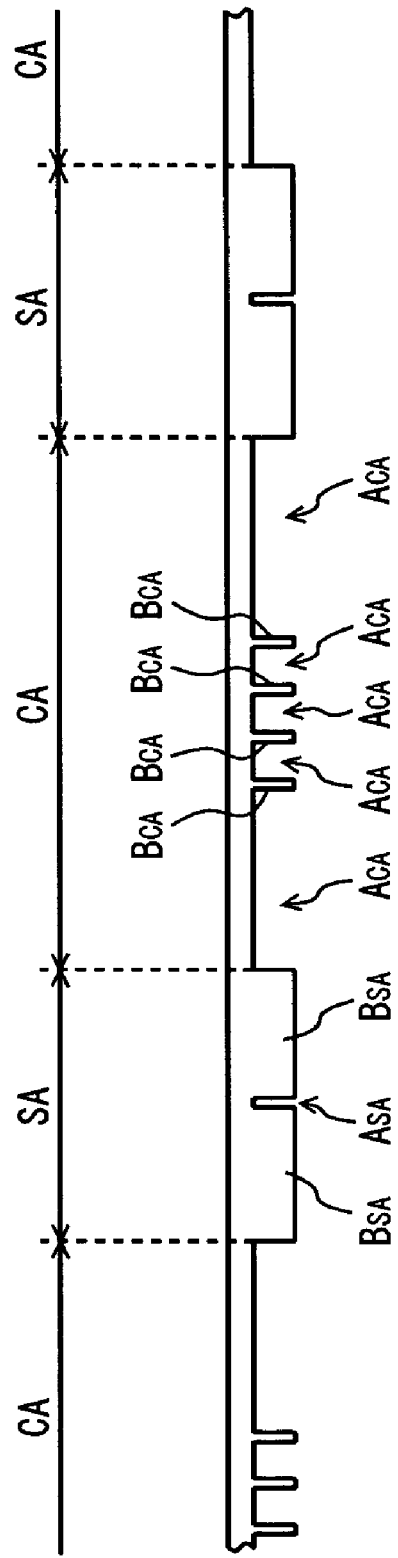
FIG. 7 is a partly developed view of the rib shown in FIG. 5.
Figure 8:
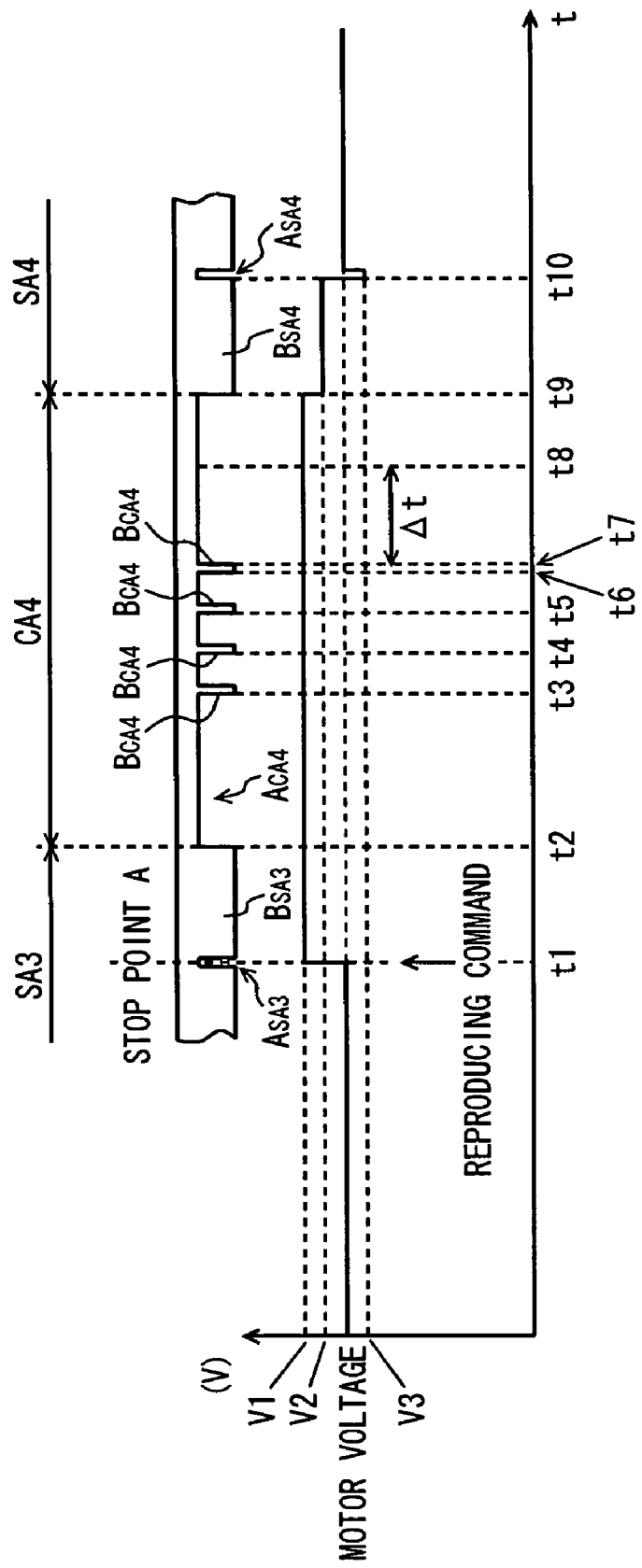
FIG. 8 is a timing chart for use in illustration of the operation of the carousel changer shown in FIG. 5.
Figure 9:
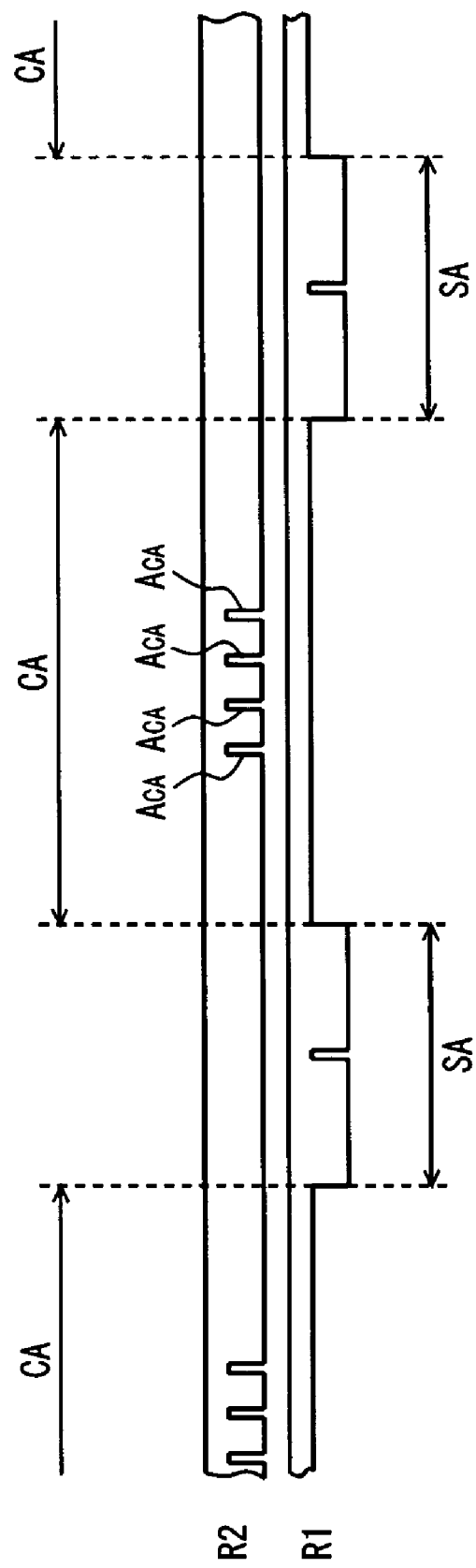
FIG. 9 is a developed view of another rib in a conventional carousel changer.

The turntable 20 is provided with a plurality of trays 1 around its rotating shaft for carrying a plurality of optical disks thereon, which is the same as that in FIG. 5. The sensor 9 includes an infrared-emitting diode 91 and a phototransistor 92. The infrared-emitting diode 91 outputs infrared radiation to the phototransistor 92. When there is nothing obstructing between the infrared-emitting diode 91 and the phototransistor 92, the phototransistor 92 receives the infrared radiation and the sensor 9 outputs a signal $\Phi A$.

The waveform-shaping device 60 converts the signal $\Phi A$ output from the sensor 9 into a digital signal $\Phi B$. The controller 50 receives the digital signal $\Phi B$, determines the tray number and the stopping position, and outputs control signals $\Phi C1$ to $\Phi C3$ to the motor driver 70. The control signal $\Phi C1$ is used to normally rotate the motor 12. The normal rotation of the motor 12 causes the turntable 20 to rotate counter-clockwise. The control signal $\Phi C2$ is used to reversely rotate the motor 12. The control signal $\Phi C3$ is used to lower the rotating speed of the motor 12. The controller 50 includes a timer 51 and memories M1 to M3. The memories M1 and M2 store the count value of the timer 51.

The memory M3 is used to specify a tray number. The operation of the timer 51 and the memories M1 to M3 will be described later. The motor driver 70 receives the control signals ΦC1 to ΦC3 and outputs a signal ΦD for having the motor 12 to rotate the pinion gear 7 to the motor 12. The other configuration is the same as that shown in FIG. 5.

Figure 2:
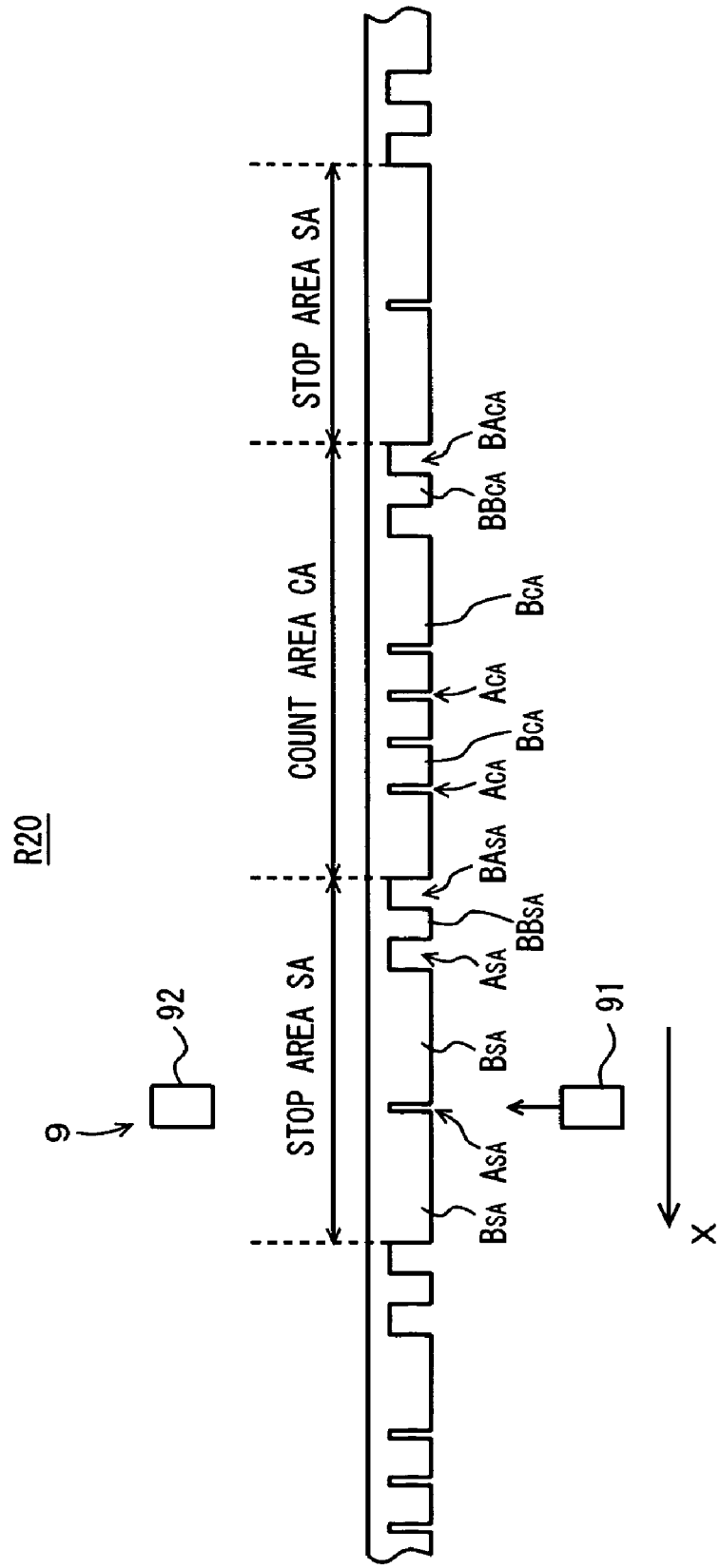
FIG. 2 is a developed view of the rib shown in FIG. 1.

FIG. 2 is a partly developed view of the rib R20 shown in FIG. 1. Referring to FIG. 2, the rib R20 includes stop areas SA and count areas CA both as many as the number of the trays 1 provided at the turntable 20. The stop area SA includes a plurality of recessed portions $A_{SA}$ and a plurality of raised portions $B_{SA}$. The count area CA also includes a plurality of recessed portions $A_{CA}$ and a plurality of raised portions $B_{CA}$. The raised portion $B_{SA}$ and the recessed portion $A_{SA}$ have widths that satisfy the following expression (1), and the raised portion $B_{CA}$ and the recessed portion $A_{CA}$ have widths that satisfy the following expression (2):

$$\text{Width of raised portion } B_{SA} > \text{width of recessed portion } A_{SA} \tag{1}$$

$$\text{Width of raised portion } B_{CA} > \text{width of recessed portion } A_{CA} \tag{2}$$

When the turntable 20 rotates counter-clockwise, the rib R20 moves in the X-direction with respect to the sensor 9. Therefore, the sensor 9 detects the recessed portions $A_{CA}$ and the raised portions $B_{CA}$ in the count area CA after detecting the recessed portions $A_{SA}$ and the raised portions $B_{SA}$ in the stop area SA. The stop area SA has a boundary raised portion $BB_{SA}$ and a boundary recessed portion $BA_{SA}$ adjacent to the next count area CA. The boundary raised portion $BB_{SA}$ and the boundary recessed portion $BA_{SA}$ have widths that satisfy the following expression (3):

$$\text{Width of boundary raised portion } BB_{SA} \leq \text{width of boundary recessed portion } BA_{SA} \tag{3}$$

The count area CA also has a boundary raised portion $BB_{CA}$ and a boundary recessed portion $BA_{CA}$ adjacent to the next stop area SA. The boundary raised portion $BB_{CA}$ and the boundary recessed portion $BA_{CA}$ have widths that satisfy the following expression (4):

$$\text{Width of boundary raised portion } BB_{CA} \leq \text{width of boundary recessed portion } BA_{CA} \tag{4}$$

In the count area CA of the rib R20, the tray number is identified based on the recessed portions $A_{CA}$. The width of the raised portion $B_{CA}$ can be broaden as compared to the conventional rib R10 that allows the tray number to be identified based on the raised portions $B_{CA}$. Therefore, the strength of the rib can be improved.

It will be described how the carousel changer 80 operates to exchange an optical disk on the tray No. 3 with an optical disk on the tray No. 4.

Figure 3:
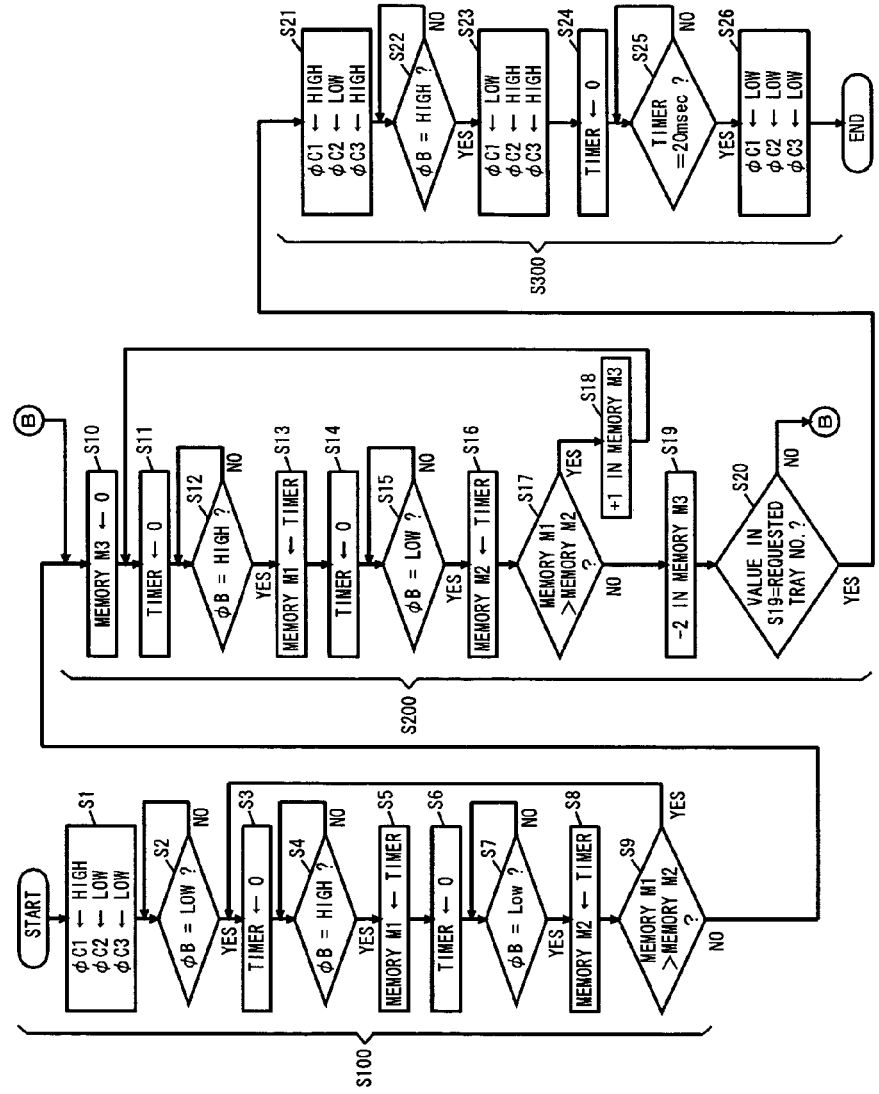
FIG. 3 is a flowchart for use in illustration of the operation of the carousel changer shown in FIG. 1.
Figure 4:
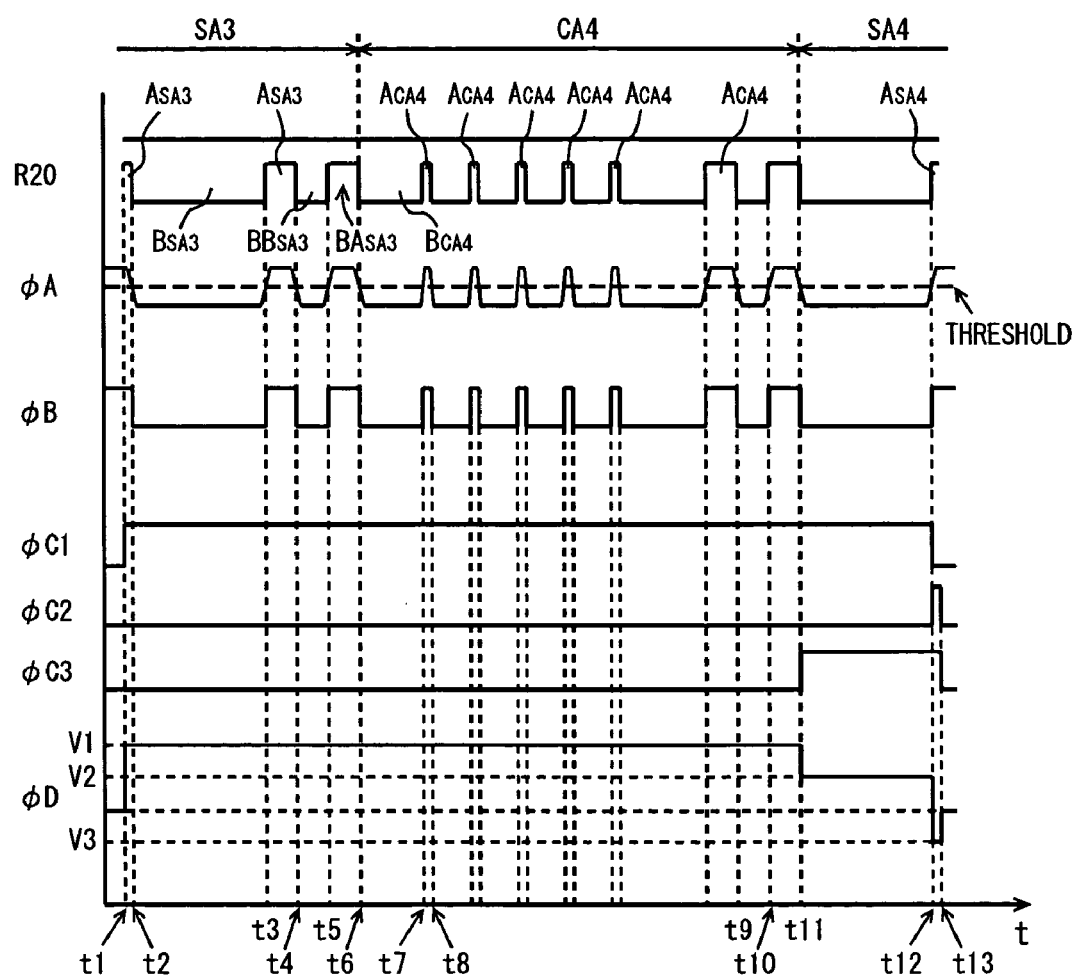
FIG. 4 is a timing chart for use in illustration of the carousel changer shown in FIG. 1.

Referring to FIGS. 3 and 4, at time t1, the carousel changer receives a reproducing command for the optical disk on the tray No. 4. The controller 50 rotates the turntable 20, and carries out the count area determining operation (S100) of determining when the area subjected to the sensor 9 changes from a stop area SA to a count area CA, the counting operation (S200) of counting the tray numbers in the count area, and the stopping operation (S300) of stopping the turntable 20 while the center of the optical disk on the tray No. 4 is placed in the center of the support unit 14.

At time t1, the controller 50 carries out count area determining operation (S100). More specifically, at time t1, the controller 50 pulls the control signal ΦC1 to an H (logical high) level, the control signal ΦC2 to an L (logical low) level, and the control signal ΦC3 to an L level (S1). The motor driver 70 receives the control signals ΦC1 to ΦC3 and outputs the signal ΦD at positive voltage V1 to the motor 12. The motor 12 normally rotates in response to the signal ΦD. As a result, the turntable 20 starts to rotate counter-clockwise.

After the controller 50 outputs the control signals ΦC1 to ΦC3, the controller 50 determines whether or not the digital signal ΦB output from the waveform-shaping device 60 is at an L level (S2). If the digital signal ΦB is at an H level, the signal ΦA output from the sensor 9 is also at an H level, and the phototransistor 92 receives infrared radiation output from the infrared-emitting diode 91. Therefore, when the digital signal ΦB is at the H level, the recessed portion $A_{SA3}$ in the stop area SA3 is between the infrared-emitting diode 91 and the phototransistor 92. Herein, the stop area SA3 is a stop area for the tray with the tray No. 3. The controller 50 repeats the operation in step S2 until the signal ΦB attains an L level.

At time t2, the raised portion $B_{SA3}$ is through the sensor 9. At the time, the infrared radiation is obstructed by the raised portion $B_{SA3}$ and does not reach the phototransistor 92, and therefore the digital signal ΦB attains an L level. The controller 50 resets the timer 51 in response to the digital signal ΦB at the L level (S3). After being reset, the timer 51 starts counting up. Then, the controller 50 determines whether or not the digital signal ΦB has attained an H level (S4). If the received digital signal ΦB is at an L level, the operation in step S4 is repeated until the 5 digital signal ΦB attains an H level.

At time t3, the recessed portion $A_{SA3}$ is subjected to the sensor 9, and the digital signal ΦB attains an H level. The controller 50 stores the count value of the timer 51 from time t2 to t3 in the memory M1 (S5). The controller 50 obtains the width of the raised portion $B_{SA3}$ based on the count value from time t2 to t3.

The controller 50 again resets the timer 51 (S6), and then determines whether or not the digital signal ΦB is at an L level (S7). The controller 50 repeats the operation in step S7 until the digital signal ΦB attains an L level. At time t4, the boundary raised portion $BB_{SA3}$ is through the sensor 9, and therefore the digital signal ΦB attains an L level. At the time, the controller 50 stores the count value from time t3 to t4 in the memory M2 (S8). The count value stored in step S8 indicates the width of recessed portion $A_{SA3}$.

The controller 50 then determines whether or not the count value stored in the memory M1 in step S5 is greater than the count value stored in the memory M2 (S9). If the count value in the memory M1 is greater than the count value in the memory M2, the width of the raised portion $B_{SA3}$ is greater than the width of the recessed portion $A_{SA3}$, which satisfies the expression (1). Therefore, at time t4, the controller 50 determines that the stop area SA3 is subjected to the sensor 9. At the time, the controller 50 returns to step S3. The controller 50 repeats the operation in and after step S3 until the count value in the memory M1 is equal to or lower than the count value in the memory M2.

At time t4, the controller 50 resets the timer 51 (S3), and determines that the digital signal ΦB has attained an H level at time t5 (S4). The controller therefore stores the count value obtained from time t4 to t6 in the memory M1 as the width of the boundary raised portion $BB_{SA3}$ (S5). The digital signal ΦB attains an L level at time t6 (S8), and the count value from time t5 to t6 is stored in the memory M2 as the width of the boundary recessed portion $BA_{SA3}$. As a result of comparison between the count values in step S9, the boundary raised portion $BB_{SA3}$ is equal to or smaller than the boundary recessed portion $BA_{SA3}$, which satisfies the expression (3). At the time, the controller 50 determines that the stop area SA3 passes the sensor 9 and the count area CA4 is to enter the sensor 9. At time t6, the controller 50 switches from the count area determining operation (S100) to the counting operation (S200).

In the counting operation (S200), the controller 50 specifies the tray number of the tray to come next onto the support unit 14. In the count area CA, the tray number is represented by the number of recessed portions $A_{CA}$, and therefore the controller 50 specifies the number of recessed portions $A_{CA}$ in the count area CA. More specifically, at time t6, the controller 50 resets the memory M3 (S100) and the timer 51 (S100). Then, the controller 50 measures the width of the raised portion $B_{CA4}$. More specifically, the controller 50 determines whether or not the digital signal ΦB is at an H level (S12). At time t6, the digital signal ΦB is at an L level. When the digital signal ΦB is at an L level, the controller 50 repeats the operation in step S12 until the digital signal ΦB attains an H level. At time t7, the controller 50 determines that the digital signal ΦB is at an H level (S12). At the time, the controller 50 stores the timer count value from time t6 to t7 as the width of the raised portion $B_{CA4}$ in the memory M1 (S13). After the timer count value is stored in the memory M1, the controller 50 resets the timer 51 (S14).

The controller 50 measures the width of the recessed portion $A_{CA4}$. More specifically, the controller 50 determines whether or not the digital signal ΦB is at an L level (S15). At time t7, the digital signal ΦB is at an H level. The controller 50 repeats the operation in step S15 until the digital signal ΦB attains an L level. At time t8, the digital signal ΦB attains an L level. At the time, the controller 50 stores the timer count value from time t7 to t8 as the width of the recessed portion $A_{CA4}$ in the memory M2 (S16).

After step S16, the controller 50 determines whether or not the timer count value stored in the memory M1, i.e., the width of the raised portion $B_{CA4}$ is greater than the timer count value stored in the memory M2, i.e., the width of the recessed portion $A_{CA4}$ (S17). At time t8, the timer count value in the memory M1 is greater than the timer count value in the memory M2, which satisfies the above expression (2). At the time, the controller 50 increases the value in the memory M3 by 1 (S18).

After the increase, the operation of the controller 50 returns to step S11. The controller 50 repeats the operation in and after step S11 until the count value in the memory M1 is equal to or lower than the count value in the memory M2 in step S17. There are six recessed portions $A_{CA4}$ from time t7 to t9, and during the period, the count value in the memory M1 is larger than the count value in the memory M2 in step S17. Therefore, at time t9, the controller 50 sets the count value in the memory M3 to "6" (S18).

From time t9 to t10, the controller 50 stores the count value in the memory M1 as the width of the boundary raised portion $BB_{CA4}$ (S11 to S13), and from time t10 to t11, the controller 50 stores the count value in the memory M2 as the width of the boundary recessed portion $BA_{CA4}$ (S14 to S16). As a result of comparison in step S17, the count value in the memory M1 is equal to or lower than the count value in the memory M2. Since the result in step S17 satisfies the above expression (4), the controller 50 determines that the count area CA4 is over.

The controller 50 specifies the tray number (S19). The controller 50 calculates the tray number according to the following expression (5):

$$\text{Tray number} = \text{count value in memory M3} - 2 \quad (5)$$

Since the count value in the memory M3 is 6 at time t11, the controller 50 obtains the tray number as "4." The reason why the recessed portions $A_{CA4}$ are formed so that the count value in the memory M3 (=6) should be larger than the tray number (=4) will be described later. After the tray number is obtained, the controller 50 determines whether or not the specified tray number is the same as the tray number for which the user has given a command for reproducing (S20). The tray number specified by the user is stored in a memory that is not shown in the controller 50. When the tray number specified by the user is different from the tray number obtained in step S19, the tray coming next onto the support unit 14 as the turntable 20 rotates is not the tray specified by the user. Therefore, the controller 50 returns to step S10 and repeats the counting operation (S200). More specifically, the turntable 20 continues to rotate until the tray number obtained in step S19 matches the tray number specified by the user. According to the embodiment, the user specifies the tray number "4," which coincides with the tray number obtained in step S19. Consequently, the controller 50 ends the counting operation (S200), and starts the stopping operation (S300).

Note that in step S20 if the tray number specified by the user is different from the tray number obtained in step S19, and the controller 50 repeats the counting operation in S200, the stop areas SA and the count areas CA are not confused without having to return to the count area determining operation in S100. If the counting operation in S200 is carried out in the stop areas SA1 to SA6 of the trays No.1 to No.6, the count value in the memory M3 is always "2." Meanwhile, if the counting operation in S200 is carried out in the count areas CA1 to CA6 of the trays No.1 to No.6, the count value is from "3" to "8" and does not coincide with the count value in the stop areas SA1 to SA6. This is because the recessed portion $A_{CA}$ is formed so that the count value in the count area CA is greater than the count value "2" in the stop area SA. Consequently, when the controller 50 carries out the counting operation in S200, the stop areas SA and the count areas CA are not confused, and the tray number can be accurately specified.

According to the embodiment, although in the count area CA, the count value equals the tray number+2, the recessed portions $A_{CA}$ need only be formed so that the count value in the stop area SA and the count value in the count area CA are different.

In the stopping operation, the controller 50 carries out the operation for stopping the turntable 20 so that the center of a disk on the tray No. 4 is placed in the center of the support unit 14 of the reproducing device 13 (S300). More specifically, at time t11, the controller 50 pulls the control signal ΦC3 to an H level (S21). The control signal ΦC3 is used to lower the rotating speed of the motor 12. The control signals ΦC1 and ΦC3 are at an H level, so that the motor driver 70 lowers the voltage of the signal ΦD output to the motor 12 from V1 to V2. The motor 12 receives the signal ΦD at the voltage V2 and lowers the rotating speed of the turntable 20. This is for the purpose of placing the center of a disk on the tray No. 4 readily and accurately in the center of the support unit 14.

The controller 50 then determines whether or not the digital signal ΦB is at an H level (S22). At time t11, the digital signal ΦB is at an L level. The controller 50 repeats the operation in step S22 until the digital signal ΦB attains an H level. At time t12, the recessed portion $A_{SA4}$ is subjected to the sensor 9 and the digital signal ΦB attains an H level. At the time, the controller 50 pulls the signal ΦC1 to an L level, and the signal ΦC2 to an H level (S23). At time t12, the motor driver 70 receives the L level signal ΦC1 and the H level signal ΦC2, and pulls the voltage of the output signal ΦD to negative voltage V3. The motor 12 receives the negative voltage V3 and tries to reversely rotate. The turntable 20 that has normally rotated (counter-clockwise) then tries to reversely rotate (clockwise) by the motor 12. Consequently, the rotating speed of the turntable 20 is lowered. The controller 50 outputs the signal ΦC2 as a pulse and stops the turntable 20. At time t12, the controller 50 resets the timer 51 (S24), and maintains the signal ΦC2 at an H level until the timer 51 counts 20 msec (S25). At time t13 after the timer 51 has counted 20 msec, the controller 50 pulls all the control signals ΦC1 to ΦC3 to an L level (S26). By the above operation, at t13, the controller 50 can stop the turntable 20 while the center of the disk on the tray No. 4 is placed in the center of the support unit 14.

According to the embodiment, in the count area determining operation in S100 and the counting operation in S200, the controller 50 compares the width of the raised portion in the rib R20 in FIG. 4 to the width of the adjacent recessed portion on the right. However, the width may be compared to the width of the adjacent recessed portion on the left.

The embodiment of the invention has been shown and described simply by way of illustrating the present invention. Therefore, the invention is not limited to the embodiment described above and various changes and modifications may be made therein without departing from the scope of the invention.

What is claimed is:

1. A carousel changer, comprising:
   a turntable provided with a plurality of trays around its rotating shaft, said trays each carrying a disk thereon;
   a motor rotating said turntable;
   a rib formed annularly at said turntable, said rib including a plurality of count areas each for identifying one of said trays and a plurality of stop areas for stopping the rotation of said turntable, said stop areas alternated with said count areas, each of said count and stop areas including a plurality of recessed portions and a plurality of raised portions, said plurality of recessed portions including an internal recessed portion and a boundary recessed portion, said boundary recessed portion formed at the boundary between said count area and said stop area, said plurality of raised portions including an internal raised portion adjacent to the internal recessed portion and a boundary raised portion adjacent to the boundary recessed portion, a ratio of a width of said boundary recessed portion to a width of said boundary raised portion being different from a ratio of a width of said internal recessed portion to a width of said internal raised portion;
   a sensor detecting the width of said recessed portions and said raised portions;
   a comparator comparing the width of said recessed portion and the width of said raised portion adjacent to said recessed portion; and
   a controller controlling said motor based on the ratio of the width of said recessed portion to the width of said raised portion obtained by said comparator.

2. The carousel changer according to claim 1, wherein said controller includes a timer counting time for which said sensor detects said recessed portion or said raised portion to obtain the width of said recessed portion or said raised portion.

3. The carousel changer according to claim 1, wherein the width of said boundary raised portion is at most the width of said adjacent boundary recessed portion and the width of said internal raised portion is wider than the width of said adjacent internal recessed portion.

4. The carousel changer according to claim 1, wherein said controller identifies each of said plurality of trays based on the number of detected internal recessed portions or internal raised portions while said sensor detects said count area.

5. The carousel changer according to claim 4, wherein said controller counts the number of detected internal recessed portions or internal raised portions by determining that the width of said raised portion is wider than the width of said adjacent recessed portion.

6. The carousel changer according to claim 4, wherein the number of internal recessed portions or internal raised portions in said count area is different from the number of internal recessed portions or internal raised portions in said stop area.

* * * * *